United States Patent
Leblanc et al.

(10) Patent No.: US 9,088,037 B2
(45) Date of Patent: Jul. 21, 2015

(54) ELECTRODE MATERIAL FOR LITHIUM ELECTROCHEMICAL CELLS

(71) Applicant: Bathium Canada Inc., Boucherville (CA)

(72) Inventors: Patrick Leblanc, Boucherville (CA); Frederic Cotton, Montreal (CA); Alain Vallee, Varennes (CA); Edison Men, Brossard (CA)

(73) Assignee: Bathium Canada Inc., Boucherville, Quebec ( * ) Notice: Subject to any disclaimer, the term of this patent is extended or adjusted under 35 U.S.C. 154(b) by 8 days.

(21) Appl. No.: 13/902,142

(22) Filed: May 24, 2013

(65) Prior Publication Data
US 2013/0316251 A1 Nov. 28, 2013

Related U.S. Application Data

(60) Provisional application No. 61/651,744, filed on May 25, 2012.

(51) Int. Cl.
| | |
|---|---|
| *H01M 4/131* | (2010.01) |
| *H01M 4/36* | (2006.01) |
| *H01M 4/62* | (2006.01) |
| *H01M 10/052* | (2010.01) |
| *H01M 4/58* | (2010.01) |
| *H01M 10/0565* | (2010.01) |
| *H01M 4/1391* | (2010.01) |
| *H01M 4/02* | (2006.01) |

(52) U.S. Cl.
CPC ............ *H01M 4/131* (2013.01); *H01M 4/366* (2013.01); *H01M 4/5825* (2013.01); *H01M 4/622* (2013.01); *H01M 4/625* (2013.01); *H01M 10/052* (2013.01); *H01M 10/0565* (2013.01); *H01M 2004/021* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 6,855,273 B2 | 2/2005 | Ravet et al. | |
| 2009/0226635 A1* | 9/2009 | Leblanc et al. | 427/557 |
| 2010/0203388 A1* | 8/2010 | Kim et al. | 429/223 |
| 2012/0196096 A1 | 8/2012 | Uematsu | |
| 2013/0108776 A1* | 5/2013 | Li et al. | 427/8 |

FOREIGN PATENT DOCUMENTS

| | | | |
|---|---|---|---|
| CA | 2678591 | | 5/2009 |
| CA | 2787989 | | 8/2011 |
| JP | 2009224099 A | * | 10/2009 |
| JP | 2012096949 A | * | 5/2012 |
| JP | 2012-256509 | | 12/2012 |
| KR | 101093266 B1 | * | 12/2011 |

OTHER PUBLICATIONS

Li et al. "Optimization of LiFePO4 Nanoparticle Suspension with Polyethyleneimine for Aqueous Processing", Langmuir, pp. 3783-3790 (published Jan. 31, 2012).*
KPION Machine Translation of KR 101093266B1 (Dec. 2011).*

* cited by examiner

*Primary Examiner* — Gregg Cantelmo
(74) *Attorney, Agent, or Firm* — McMillan LLP

(57) ABSTRACT

An electrochemically active material is disclosed in which the particles of electrochemically active material have a zeta potential of less than 25 mV in absolute value (−25 mV to 0 mV; 0 mV to 25 mV) as measured in the medium (water and/or organic solvent) in which the particles are dispersed.

5 Claims, 2 Drawing Sheets

ELECTRODE MATERIAL FOR LITHIUM ELECTROCHEMICAL CELLS

FIELD OF THE INVENTION

The present invention relates to electrode materials for lithium electrochemical cells and more specifically to electrode materials in particle form having low surface charges.

BACKGROUND OF THE INVENTION

Lithium polymer batteries use a solid electrolyte comprising a polymer and a lithium salt to separate the positive electrode from the negative electrode and to provide ionic conductivity between the electrodes. The negative electrode may be a lithium or lithium alloy metal sheet or an active material capable of insertion and deinsertion of lithium ions such as carbon or $Li_4Ti_5O_{12}$ in a polymer binder while the positive electrode consists of electrochemically active material particles such as $LiFePO_4$, $LiMnO_2$, $LiMn_2O_4$, etc., an electronically conductive additive and a solid polymer electrolyte which acts as a binder as well as provides the required ionic path between the electrochemically active material particles of the positive electrode and the electrolyte separator.

Contrary to lithium ion batteries which use a liquid electrolyte and therefore the electrodes of a lithium ion electrochemical cell must be porous to allow the liquid electrolyte to soak the electrodes in order to provide the ionic path between the electrochemically active material and/or insertion material of the electrodes and the electrolyte separator, the electrodes of a lithium polymer batteries must have a very low porosity since the binder of its electrodes acts as an ionic conductor and there is no need for any porosity as in the electrodes of a lithium ion electrochemical cell.

The electrodes of a lithium polymer electrochemical cell are preferably loaded with the maximum amount of electrochemically active material particles to obtain the maximum energy density and therefore are preferably compacted to the maximum. Any porosity in the electrodes becomes wasted space and reduces the energy density of the lithium polymer electrochemical cell.

To achieve maximum compaction of the electrodes, the particle size distribution (PSD) of the electrochemically active material is important as described US patent application No. 2010/0273054 which is herein incorporated by reference, and furthermore, in a coating process wherein the particles are in suspension in an aqueous solution and/or an organic solvent, an ideal PSD is necessary but not sufficient to achieve maximum compaction and low porosity of the electrodes as a phenomenon of inter-particles repulsion comes into play that prevent maximum compaction of the electrodes.

Therefore, there is a need for an electrochemically active material in which the inter-particles repulsion forces are reduced to a minimum.

SUMMARY OF THE INVENTION

It is an object of the present invention to ameliorate at least some of the inconveniences present in the prior art.

In one aspect, the invention provides electrochemically active material particles having a zeta potential of less than 25 mV in absolute value (−25 mV to 0 mV; 0 mV to 25 mV) as measured in the medium (water and/or organic solvent) in which the particles are dispersed.

Also, the zeta potential measurement is done in the medium at ambient temperature and neutral pH.

In a further aspect, the electrochemically active material particles are coated with a layer of carbon and a substantial portion of the surfaces of the particles is covered with the layer of carbon.

In a further aspect, the invention provides an electrode for a lithium polymer electrochemical cell comprising electrochemically active material particles, an electronically conductive additive and a polymer and lithium salt mixture acting as a binder and as an ionic conductor, characterized in that the electrochemically active material particles have a zeta potential of less than 25 mV in absolute value (−25 mV to 0 mV; 0 mV to 25 mV) as measured in the medium (water and/or organic solvent) in which the particles are dispersed.

In an additional aspect, the invention provides a lithium polymer electrochemical cell having a negative electrode, a positive electrode and a solid electrolyte separator wherein at least the positive electrode comprises electrochemically active material particles, an electronically conductive additive and a polymer and lithium salt mixture acting as a binder and as an ionic conductor, characterized in that the electrochemically active material particles have a zeta potential of less than 25 mV in absolute value (−25 mV to 0 mV; 0 mV to 25 mV) as measured in the medium (water and/or organic solvent) in which the particles are dispersed.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Positive electrodes for lithium polymer electrochemical cells are preferably manufactured by a coating process which consists of mixing and dispersing the constituents of the electrode (electrochemically active material particles, electronically conductive additive, a polymer and a lithium salt) in an aqueous solution or an organic solvent and thereafter layering the dispersion/solution in the form of a thin film and evaporating the water and/or solvent to obtain a dry film.

In the process of attempting to achieve maximum compaction of the electrodes which in effect means to pact as much electrochemically active material in an electrode, the inventors have found that when the particles of electrochemically active material are dispersed in an aqueous and/or organic solution, a phenomenon of inter-particles repulsion occurs, which is directly related to the surface charges of the particles in the aqueous and/or organic solution, when the particles are very close to each other. Indeed, when the particles of electrochemically active material become very close to each other, their surface charges begin to act by repulsing the neighbouring particles thereby preventing a tighter packing of the particles and therefore preventing maximum compaction of the electrodes.

To alleviate this final barrier to maximum compaction of the electrodes and minimum porosity of the electrodes, tests were conducted with experimental particles of electrochemically active material selected with surface charges leading to a wide range of zeta potentials. It was found that indeed, the low surface charges of the particles of the electrochemically active material reduced the inter-particles repulsion and enabled to produce an electrode via a coating process that was more compact resulting in less porosity.

The zeta potential is a measure of the surface charges of the particles. The measurement is taken in the medium (water and/or organic solvent) in which the particles are dispersed. The measure of the zeta potential of the particles is indicative of the force of the inter-particles repulsion since the surface charges of the particles are all negative or all positive for the repulsion to occur. It is therefore the absolute value (positive or negative) of the zeta potential of the particles that must be below 25 mV. Preferably, the absolute value of the zeta potential of the particles should be below 15 mV.

In a coating process, if the particles of electrochemically active material have a zeta potential near zero, the suspension of the particles in the aqueous or organic solution may become unstable and may sediment. One way to prevent this is to increase the viscosity of the suspension to reduce the terminal velocity of the particle and slow down the sedimentation rate of the suspension. And, of course adequate mixing should be always maintained.

Figure 1:
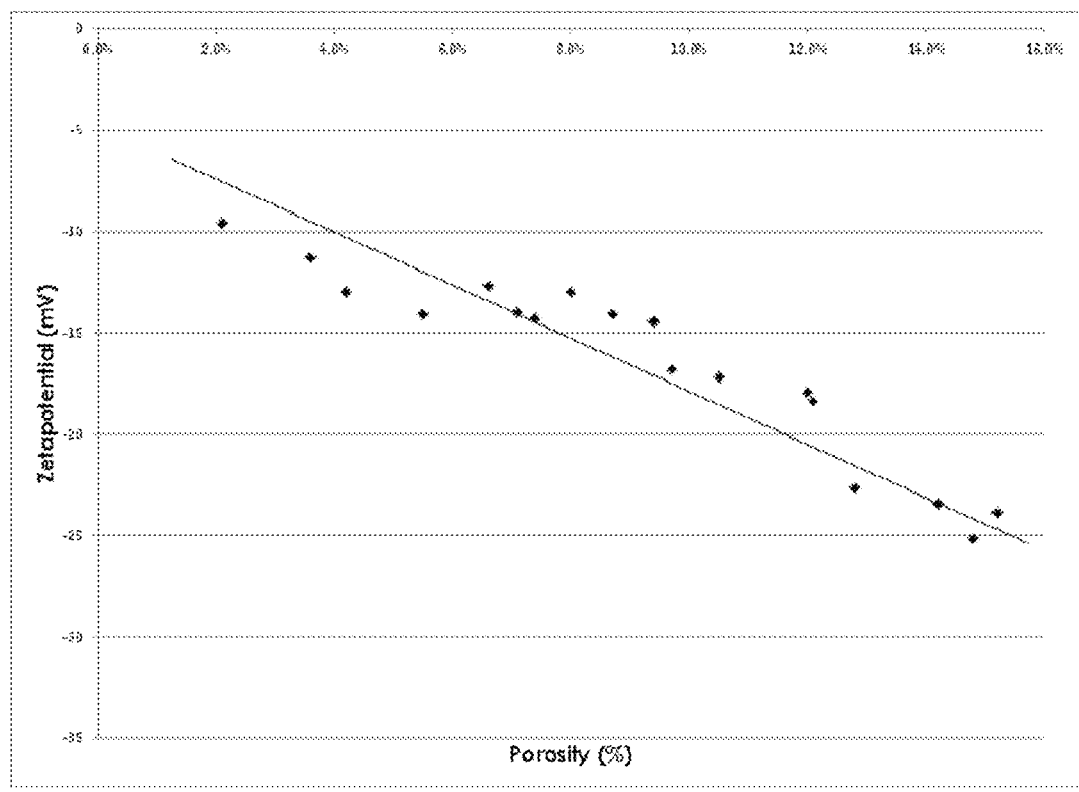
FIG. 1 is a graph illustrating the relation between the zeta potential of experimental particles of electrochemically active materials and the porosity of an electrode produced with the experimental particles of electrochemically active materials.

There is therefore a direct correlation between the surface charges (zeta potential) of the particles of electrochemically active material used in the manufacturing of electrodes and the compaction and porosity of the resulting electrode. As illustrated in FIG. 1, which illustrates the relation between the zeta potential in millivolts (mV) of experimental particles of electrochemically active materials and the porosity in percent (%) of electrodes produced with the respective electrochemically active materials, it can be seen that there is a strong relationship between the zeta of the particles of electrochemically active materials and the porosity of the electrodes produced: The porosity of the electrodes produced decreasing with the zeta potential of the particles used. The graph shows that the probabilities of obtaining an electrode having a porosity of less than 10% increases if the zeta potential of the particles used is less than 25 mV. The probabilities of obtaining a porosity-free electrode increase as the absolute value of the zeta potential of the particles used decreases and the probabilities are much higher when the absolute value of the zeta potential of the particles is less than 15 mV.

The objective is to obtain an electrode having no porosity and the use of particles of electrochemically active materials having a zeta potential as low as possible increases the probabilities of obtaining electrodes having no porosity.

In the specific case of particles of C-LiFePO4 as the electrochemically active material, these particles are coated at the microscopic level with a thin layer of carbon to increase their electronic conduction. It was found that this thin layer of carbon acts as a shield and isolates the particles thereby reducing the effective surface charge of the particles. From that realisation, it has been possible to reduce the surface charges of the particles of C-LiFePO4 to less than 25 mV by controlling the carbon coating to ensure that a substantial portion of the surface of the particles are coated with a thin layer of carbon.

In the manufacturing process of an electrode, the particles of electrochemically active material are often subjected to mechanical stresses while dispersing in the aqueous or organic solution to ensure that the agglomerates of particles are broken down and the particle size distribution is optimal. In the specific case of particles of C-LiFePO4, it is important that the stresses on the material is not too aggressive which would have the effect of deteriorating the carbon coating on the particles and therefore increasing the surface charges of the particles.

For other electrochemically active material such as $Li_4Ti_5O_{12}$, $LiMnO_2$, $LiMn_2O_4$, etc., on which carbon may or may not be present, surface charges of the particles may be affected in a similar way as previously described or modified by surface chemistry.

Figure 2:
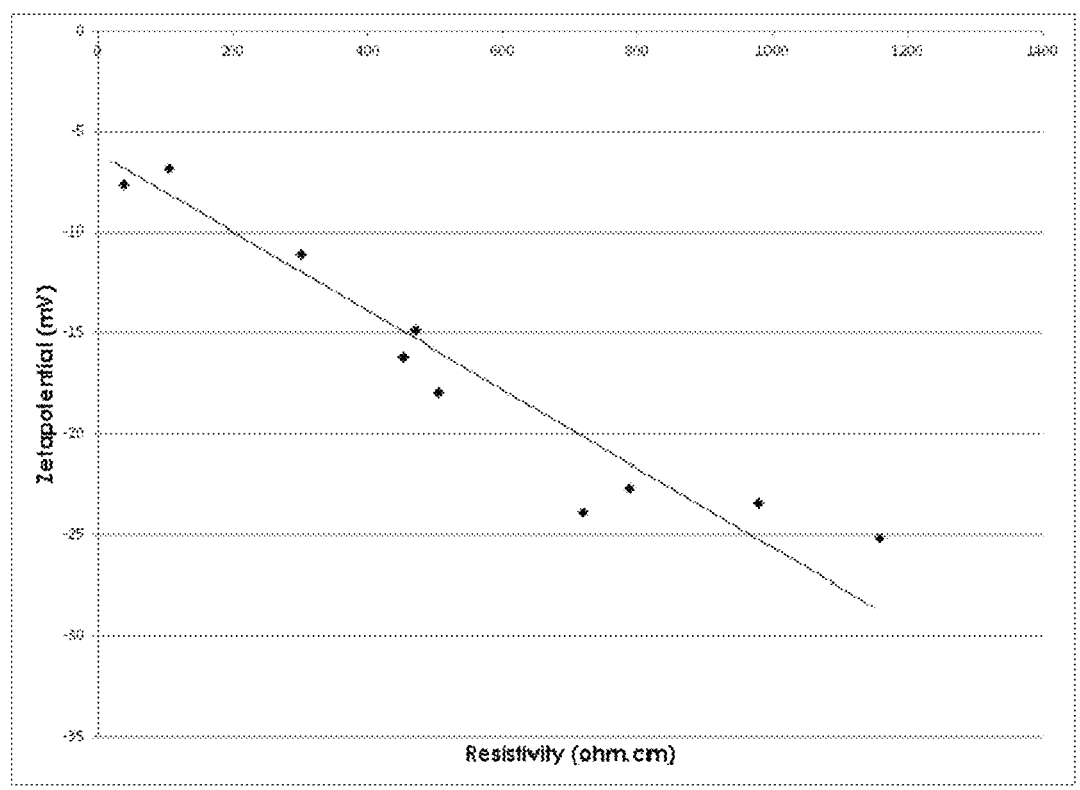
FIG. 2 is a graph illustrating the relation between the zeta potential of the experimental particles of electrochemically active materials of FIG. 1 and the resistivity of an electrode containing the experimental particles of electrochemically active materials.

Furthermore, it was found that there is a direct correlation between the zeta potential of the experimental particles of electrochemically active material and the electronic resistivity of the electrode produced. As shown in FIG. 2, which is a graph illustrating the relation between the zeta potential (mV) of the experimental particles of electrochemically active materials and the resistivity of electrodes produced with the experimental particles of electrochemically active materials, we can see that the resistivity of the electrodes produced decreases with the zeta potential of the particles used. Therefore, particles of electrochemically active materials having a low zeta potential i.e. less than 25 mV and preferably less than 15 mV, also have the effect of reducing the resistivity of the electrode produced and as such further improve the performance of the electrochemical cell assembled with electrodes produced with particles of electrochemically active materials having a low zeta potential.

The objective is to obtain an electrode having a resistivity that tends towards zero and the use of particles of electrochemically active materials having a zeta potential as low as possible increases the probabilities of obtaining electrodes having a very low resistivity.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. An electrode for a lithium polymer electrochemical cell comprising electrochemically active material particles selected from the group consisting of $LiFePO_4$, $Li_4Ti_5O_{12}$, $LiMnO_2$ and $LiMn_2O_4$, an electronically conductive additive and a polymer and lithium salt mixture acting as a binder and as an ionic conductor, characterized in that the electrochemically active material particles have a zeta potential of less than 25 mV in absolute value (−25 mV to 0 mV; 0 mV to 25 mV) as measured in the medium (water and/or organic solvent) in which the particles are dispersed and the electrode has a porosity of less than 10%.

2. An electrode as defined in claim 1 wherein the electrochemically active material particles have a zeta potential of less than 15 mV in absolute value.

3. An electrode as defined in claim 1 wherein the electrochemically active material particles are coated with a layer of carbon and a substantial portion of the surfaces of the particles is covered with the layer of carbon.

4. A lithium polymer electrochemical cell having a negative electrode, a positive electrode and a solid electrolyte separator wherein at least the positive electrode comprises electrochemically active material particles selected from the group consisting of $LiFePO_4$, $Li_4Ti_5O_{12}$, $LiMnO_2$ and $LiMn_2O_4$, an electronically conductive additive and a polymer and lithium salt mixture acting as a binder and as an ionic conductor, characterized in that the electrochemically active material particles have a zeta potential of less than 25 mV in absolute value (−25 mV to 0 mV; 0 mV to 25 mV) as measured in the medium (water and/or organic solvent) in which the particles are dispersed and the positive electrode has a porosity of less than 10%.

5. A lithium polymer electrochemical cell as defined in claim 4, wherein the electrochemically active material particles have a zeta potential of less than 15 mV in absolute value.

\* \* \* \* \*